(12) United States Patent
Bian

(10) Patent No.: US 6,545,106 B1
(45) Date of Patent: Apr. 8, 2003

US006545106B1

(54) PROCESS FOR THE POLYMERIZATION OF OLEFINES

(75) Inventor: Jiang Bian, Brussels (BE)

(73) Assignee: Solvay (Societe Anonyme), Brussels (BE)

( * ) Notice: Subject to any disclaimer, the term of this patent is extended or adjusted under 35 U.S.C. 154(b) by 1403 days.

(21) Appl. No.: 08/851,742

(22) Filed: May 6, 1997

Related U.S. Application Data

(63) Continuation of application No. 08/532,254, filed on Sep. 22, 1995, now abandoned.

(30) Foreign Application Priority Data

Sep. 22, 1994 (BE) .............................................. 9400857

(51) Int. Cl.$^7$ ................................................. C08F 4/44
(52) U.S. Cl. ................. 526/123.1; 526/352; 526/124.3; 526/158; 526/124.8; 502/103; 502/115; 502/125
(58) Field of Search .............................. 526/124.8, 352, 526/124.3, 123.1, 158; 502/103, 115, 125

(56) References Cited

U.S. PATENT DOCUMENTS

| | | |
|---|---|---|
| 4,305,840 A | 12/1981 | Zucchini et al. |
| 4,588,703 A | 5/1986 | Cowan et al. |
| 4,804,726 A | 2/1989 | Kondo et al. |
| 4,921,920 A | 5/1990 | Collomb-Ceccarini et al. |
| 5,122,494 A | 6/1992 | Job |
| 5,225,502 A | 7/1993 | Sato et al. |
| 5,278,118 A | 1/1994 | Cuffiana et al. |

FOREIGN PATENT DOCUMENTS

| | | |
|---|---|---|
| EP | 0 060 443 | 9/1982 |
| EP | 0 522 423 | 1/1993 |
| EP | 0 634 426 | 1/1995 |
| FR | 2 311 032 | 5/1976 |
| FR | 2 656 313 | 6/1991 |
| GB | 1 464 909 | 2/1977 |
| GB | 1 538 472 | 1/1979 |
| GB | 1 539 175 | 1/1979 |

*Primary Examiner*—David W. Wu
*Assistant Examiner*—Ling-Siu Choi
(74) *Attorney, Agent, or Firm*—Venable; Marina V. Schneller

(57) ABSTRACT

Process for the polymerization of olefins, according to which at least one olefin is placed in contact with a catalytic system comprising:

a) a solid catalytic complex based on magnesium, transition metal and halogen, the said catalytic complex being prepared by reacting, in a first step, at least one magnesium compound with at least one compound of a transition metal from group IVB or VB of the Periodic Table, until a liquid complex is obtained, and, in a subsequent step, by precipitating the said liquid complex using a halogen-containing organoaluminium compound of general formula $AlR_nX_{3-n}$ in which R is a hydrocarbon radical, X is a halogen and n is less than 3, in order to collect a solid catalytic complex, and b) an organometallic compound of a metal from groups IA, IIA, IIB, IIIA and IVA of the Periodic Table, c) at least one electron donor used after the first step in the preparation of the solid catalytic complex leading to the production of a liquid complex.

21 Claims, No Drawings

PROCESS FOR THE POLYMERIZATION OF OLEFINES

This is a continuation of application Ser. No. 08/532,254 filed Sep. 22, 1995 abn.

FIELD OF THE INVENTION

The present invention relates to a process for the polymerization of olefins, more precisely to a polymerization process in the presence of a catalytic system comprising a solid catalytic complex based on magnesium, on transition metal and on halogen, and an organometallic compound (cocatalyst).

TECHNOLOGY REVIEW

British Patent GB 1,464,909 discloses catalytic systems comprising a solid based on magnesium, on transition metal and on halogen, and a cocatalyst. In Example 1 of that patent, ethylene is polymerized in the presence of triisobutylaluminium (cocatalyst) and a catalytic solid obtained by mixing magnesium ethoxide with tetrabenzyltitanium and by adding ethylaluminium dichloride thereto until a solid precipitate is obtained.

The polyethylene obtained in the presence of this known catalytic solid has a high content of oligomers (low molecular weight polymers comprising not more than 15 monomer units) which are responsible, during subsequent use of the polyethylene, for example in a bottle-blowing process, for the emission of fumes. Moreover, the oligomers degrade the mechanical and rheological properties of the polyolefins.

SUMMARY OF THE INVENTION

The invention is directed towards overcoming this drawback by providing a novel process for the manufacture of polyolefins which have in particular a low content of oligomers and improved mechanical and rheological properties.

DETAILED DESCRIPTION OF THE INVENTION

To this end, the invention relates to a process for the polymerization of olefins, according to which at least one olefin is placed in contact with a catalytic system comprising:
- a) a solid catalytic complex based on magnesium, on transition metal and on halogen, the said catalytic complex being prepared by reacting, in a first step, at least one magnesium compound chosen from oxygen-containing organomagnesium compounds and halogen-containing magnesium compounds with at least one compound of a transition metal from group IVB or VB of the Periodic Table chosen from oxygen-containing organic compounds and halogen-containing compounds of a transition metal, until a liquid complex is obtained, and, in a subsequent step, by precipitating the said liquid complex using a halogen-containing organoaluminium compound of general formula $AlR_nX_{3-n}$ in which R is a hydrocarbon radical, X is a halogen and n is less than 3, in order to collect a solid catalytic complex, and
- b) an organometallic compound of a metal from groups IA, IIA, IIB, IIIA and IVA of the Periodic Table;

according to the invention, the solid catalytic system also comprises:
- c) at least one electron donor used after the first step in the preparation of the solid catalytic complex leading to the production of a liquid complex.

One of the essential features of the invention lies in the use of an electron donor in a step subsequent to the first step in the preparation of the solid catalytic complex leading to the production of a liquid complex. The Applicant has, indeed, observed that the use of an electron donor during the first step in the preparation of a liquid complex leads to catalysts which produce polymers of low apparent density, which is reflected in a low production efficiency. The electron donor may thus be used either during the preparation of the solid catalytic complex (at the same time as the subsequent step or in an additional step) or at the polymerization stage at the same time as the solid catalytic complex and the organometallic compound.

The solid catalytic complex used in the process according to the invention is preferably not prepolymerized.

In a first variant of the process according to the invention, the electron donor is used during the preparation of the solid catalytic complex immediately after the first step, that is to say after formation of the liquid complex, and before the precipitation step. The treatment using the electron donor may be carried out by any suitable known means. The electron donor may be added in the pure state to the liquid complex or in the form of a solution in a solvent such as liquid aliphatic, cycloaliphatic and aromatic hydrocarbons. The preferred solvents are hydrocarbons containing up to 20 carbon atoms, and in particular linear alkanes (such as n-butane, n-hexane and n-heptane) or branched alkanes (such as isobutane, isopentane and isooctane) or cycloalkanes (such as cyclopentane and cyclohexane). Good results are obtained with linear alkanes. Hexane is preferred.

The temperature at which the treatment using the electron donor is carried out in the first variant is generally below the decomposition temperatures of the electron donor and of the liquid complex. It is in particular at least −20° C., more precisely at least 0° C., values of at least 20° C. being more common. The temperature is usually not more than 150° C., more particularly not more than 120° C., temperatures of not more than 100° C. being recommended, for example not more than 70° C.

The duration of the treatment using the electron donor in the first variant is commonly from 0.5 minute to 5 hours, preferably from 1 minute to 2 hours, for example from 5 minutes to 1 hour. The pressure at which the treatment is performed is not critical; the process is preferably performed at atmospheric pressure.

The amount of electron donor used in the first variant is usually at least 0.01 mol per mole of transition metal used, more precisely at least 0.02 mol, values of at least 0.05 mol being the most advantageous. The amount of electron donor used usually does not exceed 50 mol per mole of transition metal used, and preferably does not exceed 30 mol, values of not more than 20 mol being the most recommended. Amounts from 0.2 to 12 mol are particularly suitable.

The first variant makes it possible not only to reduce the content of oligomers in the polyolefins obtained, but also to increase the activity of the solid catalytic complex towards polymerization, and to increase the apparent density of the polyolefins obtained. In addition, the solid catalytic complex obtained according to the first variant is more sensitive to regulators of the molecular weight of the polyolefins, such that it requires less molecular weight regulator (for example hydrogen) in order to obtain a given molecular weight. The first variant also makes it possible to modify the morphology of the solid catalytic complex and consequently the morphology of the polyolefins obtained with this solid catalytic complex. This variant makes it possible in particular to decrease the particle size distribution width of the solid catalytic complex.

In a second variant of the process according to the invention, the electron donor is used during the preparation of the solid catalytic complex after the step of precipitation of the liquid complex, and preferably after possible intermediate steps of maturation and washing of the precipitate (which are described later), but before placing the solid catalytic complex in contact with the olefin in order to polymerize it. To this end, the electron donor may be added, in the pure state or in the form of a solution in a solvent as described above, to a suspension of the solid catalytic complex in an inert diluent. This inert diluent may be chosen, for example, from aliphatic and cycloaliphatic hydrocarbons. Cycloalkanes or linear or branched alkanes containing up to 20 carbon atoms are suitable for use. Hexane is particularly suitable.

The temperature, the duration, the pressure and the amount of electron donor used in the treatment using the electron donor according to the second variant are in accordance with those of the first variant which are described above.

The second variant makes it possible not only to reduce the content of oligomers in the polyolefins obtained, but also makes it possible to modify the response of the solid catalytic complex to the polyolefin molecular weight regulators (for example hydrogen) by variation in the amount of electron donor used. Indeed, it has been observed that the more the amount of electron donor used is increased, the more pronounced is the response of the solid catalytic complex to the regulator. Consequently, a very wide range of polyolefins having markedly different molecular weights, and thus markedly different melt indices, may be obtained.

A third variant of the process according to the invention consists in using the electron donor during the polymerization and not during the preparation of the solid catalytic complex. This variant proves to give particularly good performance when the polymerization is carried out in the gas phase. In this third variant, the electron donor may be introduced separately into the polymerization medium at any moment, preferably at the start of the polymerization. In a particularly advantageous embodiment of this third variant, the electron donor is introduced into the polymerization medium mixed with the organometallic compound, the mixture being prepared beforehand. This mixture may be obtained simply by placing the electron donor in contact with the organometallic compound or by adding the electron donor, preferably gradually, to a solution of the organometallic compound or alternatively by adding a solution of the electron donor to a solution of the organometallic compound. It is preferred to add the electron donor in the pure state to a solution of the organometallic compound in a solvent as defined above for the other two variants.

The amount of electron donor used in the third variant is usually such that the molar ratio of the amount of organometallic compound used to the amount of electron donor used is at least 0.01, more precisely at least 0.05, values of at least 0.2 being the most advantageous. The ratio of these amounts usually does not exceed 100, and preferably does not exceed 80, values of not more than 60 being the most recommended.

The third variant has the advantage not only of reducing the content of oligomers in the polyolefins obtained but also of increasing the activity of the solid catalytic complex towards polymerization. This variant proves to be particularly advantageous in a gas phase polymerization process which is generally characterized by a limited capacity for heat transfer, since the kinetic profile of the solid catalytic complex has a considerable induction period.

For the purposes of the present invention, the term electron donor is understood to denote organic compounds containing one or more atoms or one or more groups of atoms having one or more pairs of free electrons, such as, for example, oxygen, nitrogen, sulphur or groups comprising one of these elements. Preferably, the electron donor is chosen from organic compounds containing one or more atoms or one or more groups of atoms having one or more pairs of free electrons with the exclusion of alcohols, phenols, silanes and polysiloxanes. Examples of electron donors which may be used in the process according to the invention are ethers, ketones, aldehydes, organic acids, organic acid esters, organic acid halides, organic acid amides, amines and nitriles.

Examples of ethers which may be mentioned are those comprising from 2 to 20 carbon atoms, such as isoamyl ether. The ketones which may generally be used are those containing from 3 to 18 carbon atoms, such as methyl ethyl ketone and acetophenone. The aldehydes commonly used are those containing from 2 to 15 carbon atoms, such as octylaldehyde and benzaldehyde. Examples of organic acids are those containing up to 24 carbon atoms, such as butyric acid and anisic acid. Organic acid esters which may be used are, for example, those containing from 2 to 30 carbon atoms, such as methyl acetate, ethyl propionate, methyl butyrate, propyl methacrylate, ethyl benzoate, phenyl benzoate, ethyl o-methoxybenzoate, methyl p-toluate, methyl salicylate, ethyl naphthoate, and ethyl or butyl phthalate and anisate. Ethyl benzoate, octadecyl 3,5-bis(1,1-dimethylethyl)-4-hydroxybenzenepropanoate and dibutyl phthalate are particularly suitable. Examples of organic acid halides which may be mentioned are those containing from 2 to 15 carbon atoms, such as acetyl chloride and toluoyl chloride. Acid amides which may be mentioned are, for example, acetamide, benzamide and toluamide. The amines which may be used are, for example, diethylamine, piperidine, tribenzylamine, aniline and pyridine. Nitriles which may be used are, for example, acetonitrile and benzonitrile. Ethers and organic acid esters are suitable for use. Organic acid esters are preferred, in particular ethyl benzoate and dibutyl phthalate and even more particularly ethyl benzoate.

The solid catalytic complex used in the polymerization process according to the invention is obtained via at least two separate and successive steps, namely a first step of formation of a liquid complex and a subsequent step of precipitation, these steps being known per se.

The first step in the preparation of the solid catalytic complex lies in the preparation of a liquid complex by reacting the magnesium compound with a transition metal compound. Obviously, it is possible to use several different magnesium compounds simultaneously. Similarly, it is also possible to use simultaneously several different compounds of a transition metal or several compounds in which the transition metal is different. The reaction of the first step may be performed by any suitable known method provided that it allows a complex in the liquid state to be obtained. When the magnesium compound and/or the transition metal compound are liquid under the operating conditions of the reaction, it is desirable to perform the reaction simply by mixing these reactants in the absence of solvent or diluent. However, the reaction may be performed in the presence of a diluent when the amount of liquid present in the reaction medium is not sufficient for the reaction to be complete or when the two reactants are solid under the operating conditions of the reaction. The diluent is generally chosen from those which are capable of dissolving at least one of the reactants and in particular from the solvents described above.

The amount of transition metal compound used is defined relative to the amount of magnesium compound used. This amount may vary within a wide range. It is generally at least 0.01 mol of transition metal present in the transition metal compound per mole of magnesium present in the magnesium compound, in particular at least 0.02 mol, values of at least 0.05 being preferred. The amount is usually not more than 20 mol of transition metal present in the transition metal compound per mole of magnesium present in the magnesium compound, more precisely not more than 10 mol, values of not more than 5 mol being recommended.

The temperature at which the magnesium compound and the transition metal compound are brought together in the first step of the preparation of the solid catalytic complex depends on the nature of the reactants and is preferably below the decomposition temperature of the reactants and of the liquid complex obtained after the reaction. It is generally at least −20° C., in particular at least 0° C., temperatures of at least 20° C. being more common. The temperature is usually not more than 200° C., more especially not more than 180° C., temperatures of not more than 150° C. being advantageous, for example of about 140° C.

The duration of the first step in the preparation of the solid catalytic complex depends on the nature of the reactants and on the operating conditions and is advantageously long enough to obtain a complete reaction between the reactants. The duration may generally range from 10 minutes to 20 hours, more precisely from 2 to 15 hours, for example from 4 to 10 hours.

The pressure at which the reaction of the first step is carried out and the rate of addition of the reactants are not critical factors. For reasons of convenience, the process is generally performed at atmospheric pressure; the rate of addition is generally chosen so as not to cause sudden heating of the reaction medium due to a possible self-acceleration of the reaction. The reaction medium is generally stirred so as to promote its homogenization throughout the reaction. The reaction may be performed in a continuous or batchwise manner.

After the first step in the preparation of the solid catalytic complex, a liquid complex of the magnesium compound and the transition metal compound is collected, which may be used as it is in the subsequent step, or which may optionally be stored in a diluent, preferably an inert diluent, in order subsequently to recover it intact and to use it in the presence of the diluent. The diluent is usually chosen from aliphatic or cycloaliphatic hydrocarbons, preferably containing up to 20 carbon atoms, such as, for example, alkanes such as isobutane, pentane, hexane, heptane or cyclohexane or mixtures thereof. Hexane is particularly suitable.

The magnesium compound is chosen from oxygen-containing organomagnesium compounds and halogen-containing magnesium compounds.

The term oxygen-containing organomagnesium compound is understood to denote all the compounds in which an organic radical is bonded to magnesium via oxygen, that is to say all the compounds comprising at least one magnesium-oxygen-organic radical bonding sequence per magnesium atom. The organic radicals bonded to magnesium via oxygen are generally chosen from radicals comprising up to 20 carbon atoms and, more particularly, from those comprising up to 10 carbon atoms. Good results are obtained when these radicals comprise from 2 to 6 carbon atoms. These radicals may be saturated or unsaturated and may contain a branched chain or a straight or cyclic chain. They are preferably chosen from hydrocarbon radicals and in particular from alkyl (linear or branched), alkenyl, aryl, cycloalkyl, arylalkyl, alkylaryl and acyl radicals and substituted derivatives thereof.

In addition to the organic radicals bonded to magnesium via oxygen, the oxygen-containing organomagnesium compounds may include other radicals. These other radicals are preferably the radicals —OH, —$(SO_4)_{1/2}$, —$NO_3$, —$(PO_4)_{1/3}$, —$(CO_3)_{1/2}$ and —$ClO_4$. They may also be organic radicals bonded directly to the magnesium via carbon.

Among the oxygen-containing organomagnesium compounds which may be used, there may be mentioned alkoxides (such as ethoxide and cyclohexanolate), alkylalkoxides (such as ethylethoxide), hydroxyalkoxides (such as hydroxymethoxide), phenoxides (such as naphthoxide), and optionally hydrated carboxylates (such as acetate and benzoate). They may also be oxygen- and nitrogen-containing organic compounds, that is to say compounds comprising magnesium-oxygen-nitrogen-organic radical bonding sequences (such as oximates, in particular butyloximate, and hydroxylamine acid salts, in particular the N-nitroso-N-phenylhydroxylamine derivative), chelates, that is to say oxygen-containing organic compounds in which the magnesium possesses at least one normal bonding sequence of the type magnesium-oxygen-organic radical and at least one coordination bond so as to form a heterocycle in which the magnesium is included (such as enolates, in particular acetylacetonate), silanolates, that is to say compounds comprising magnesium-oxygen-silicon-hydrocarbon radical bonding sequences (such as triphenylsilanolate). Examples of oxygen-containing organomagnesium compounds which may also be mentioned are those comprising several different organic radicals (such as magnesium methoxyethoxide), alkoxide and phenoxide complexes of magnesium and another metal (such as Mg[Al(OR)$_4$]$_2$) and mixtures of two or more of the oxygen-containing organomagnesium compounds defined above.

The term halogen-containing magnesium compound is understood to denote all the compounds comprising at least one magnesium-halogen bond. The halogen may be fluorine, chlorine, bromine or iodine. The halogen is preferably chlorine.

Among the halogen-containing magnesium compounds which may be mentioned are dihalides, preferably containing not more than one molecule of water per molecule of dihalide, complexed dihalides (such as $MgCl_2.6NH_3$ or $MgCl_2.6CH_3OH$) and compounds comprising, besides the magnesium-halogen bond, an organic radical bonded to the magnesium via oxygen (such as Mg(OH)Cl or Mg(O—$CH_3$)Cl). They may also be compounds comprising, besides the magnesium-halogen bond, a magnesium-organic radical bond (such as Mg($C_2H_5$)Cl), the hydrolysis products of magnesium halide hydrates, as long as these products still contain magnesium-halogen bonds, mixed compositions comprising halogen- and oxygen-containing magnesium compounds (such as $MgCl_2.MgO.H_2O$) and mixtures of two or more of the halogen-containing magnesium compounds defined above.

Among all the magnesium compounds which are suitable, it is preferred to use those which contain, on each magnesium atom, only magnesium-oxygen-organic. radical bonds and/or magnesium-halogen bonds, to the exclusion of any other bonding. The best results are obtained with oxygen-containing organic compounds, in particular with those only comprising magnesium-oxygen-organic radical bonds on each magnesium atom. Magnesium alkoxides are particularly preferred. The best results are obtained with magnesium dialkoxides, in particular magnesium diethoxide.

The transition metal compound is chosen from oxygen-containing organic compounds and halogen-containing compounds of the transition metal.

The term oxygen-containing organic transition metal compound is understood to denote all the compounds in which an organic radical is bonded to the transition metal via oxygen, that is to say all the compounds comprising at least one transition metal-oxygen-organic radical bonding sequence per transition metal atom. The organic radicals are in accordance with those defined above for the oxygen-containing organomagnesium compounds.

The transition metal is advantageously chosen from titanium, zirconium, hafnium and vanadium. Titanium and zirconium are suitable for use. Titanium is particularly preferred. In the case of titanium, zirconium or hafnium, compounds of tetravalent transition metal are preferably used since they are usually liquid and, in any case, more often soluble and more soluble than those in which the transition metal has a valency of less than 4.

The oxygen-containing organic transition metal compounds which may be used may also comprise transition metal-oxygen-transition metal bonds.

The oxygen-containing organic transition metal compounds may be represented by the general formula $MO_x(OR')_{m-2x}$ where M represents the transition metal of valency m, R' represents an organic radical as defined above and x is a number such that $0 \leq x \leq (m-1)/2$. It is preferred to use compounds in which x is such that $0 \leq x \leq (m-2)/2$.

It goes without saying that the oxygen-containing organic transition metal compounds may comprise several different organic radicals.

Among the oxygen-containing organic transition metal compounds which may be mentioned are alkoxides (such as $Ti(O-nC_4H_9)_4$), phenoxides (such as $Zr(OC_6H_5)_4$), oxy-alkoxides (such as $HfO(OC_2H_5)_2$), condensed alkoxides (such as $Ti_2O(O-iC_3H_7)_6$), carboxylates (such as $Zr(OOCCH_3)_4$) and enolates (such as hafnium acetylacetonate).

The term halogen-containing transition metal compound is understood to denote all the compounds comprising at least one transition metal-halogen bond. The halogen is in accordance with that defined above for the halogen-containing magnesium compounds. Chlorine is preferred.

Among the halogen-containing transition metal compounds which may be mentioned are halides, in particular tetrahalides (such as $TiCl_4$), complexed halides (such as $ZrCl_4 \cdot 6NH_3$), complex halides of a transition metal and an alkali metal (such as $Na_2TiCl_6$), oxyhalides (such as $HfOCl_2$) and haloalkoxides (such as $Ti(OC_2H_5)_2Cl_2$ or $Zr(OiC_3H_7)_3Cl$).

It goes without saying that several transition metal compounds may be used simultaneously. When it is desired to obtain a polyolefin having a wide molecular weight distribution, it may turn out to be preferable to use compounds of different transition metals, in particular a titanium compound and a zirconium compound.

Among all the transition metal compounds which are suitable, it is preferred to use those which contain, on each transition metal atom, only transition metal-oxygen-organic radical bonds and/or transition metal-halogen bonds, to the exclusion of any other bonding. The best results are obtained with the oxygen-containing organic transition metal compounds, in particular with those comprising only transition metal-oxygen-organic radical bonds on each transition metal atom. Alkoxides are suitable for use. The best results are obtained with the tetraalkoxides of titanium or of zirconium, in particular titanium or zirconium tetrabutoxide.

The preparation of the solid catalytic complex comprises a subsequent step, which is referred to as the precipitation step and which has the function of reducing the valency of the transition metal and simultaneously of halogenating, if necessary, the magnesium compound and/or the transition metal compound, that is to say of substituting the alkoxy groups present in the magnesium compound and/or in the transition metal compound by halogens, such that the liquid complex obtained after the first step is precipitated as a solid catalytic complex. The reduction and the possible halogenation are performed simultaneously using the halogen-containing organoaluminium compound which thus acts as a reductive halogenating agent, causing precipitation of a solid catalytic complex.

The treatment using the halogen-containing organoaluminium compound in the step of precipitation of the solid catalytic complex may be carried out by any suitable known means, and preferably by gradually adding the halogen-containing organoaluminium compound to the liquid complex obtained in the abovementioned first step.

The amount of halogen-containing organoaluminium compound to be used depends on the amounts of magnesium compound and of transition metal compound used and is advantageously sufficient to obtain the desired rate of reduction and, where appropriate, the desired rate of halogenation. In practice, there is no advantage in using an amount greater than the minimum amount required to obtain complete reduction and, where appropriate, complete halogenation, since any excess used leads to an increase in the aluminium content in the solid catalytic complex, which is not desirable. In general, the amount is at least 0.5 mol of aluminium per mole of transition metal used, preferably at least 1 mol, values of at least 2 mol being the most common; it is commonly not more than 50 mol of aluminium per mole of transition metal used, in particular not more than 30 mol, values of not more than 20 mol being advantageous.

The temperature at which the step for precipitation of the liquid complex is performed is advantageously below the boiling point, at ordinary pressure, of the halogen-containing organoaluminium compound. It is usually at least −20° C., more particularly at least 0° C., temperatures of at least 20° C. being recommended. The temperature usually does not exceed 150° C., and more especially does not exceed 100° C., temperatures of not more than 80° C. being the most common.

The step for precipitation of the liquid complex is preferably long enough to obtain complete precipitation. It may range from 1 minute to 10 hours, more precisely from 10 minutes to 8 hours, for example from 0.5 to 5 hours.

The pressure at which the step for precipitation of the liquid complex is carried out is not a critical factor. For reasons of convenience, the process is generally performed at atmospheric pressure. The rate of addition of the reactants is generally chosen so as not to cause sudden heating of the reaction medium due to a possible self-acceleration of the reaction. The reaction medium is generally stirred so as to promote its homogenization throughout the reaction. The reaction may be performed in a continuous or batchwise manner.

The halogen-containing organoaluminium compound advantageously corresponds to the formula $AlR_nX_{3-n}$ in which R is a hydrocarbon radical comprising up to 20 carbon atoms and preferably up to 6 carbon atoms. Good results are obtained when R is an alkyl (linear or branched), cycloalkyl, arylalkyl, aryl or alkylaryl radical. The best results are obtained when R represents a linear or branched alkyl radical. X is generally chooen from fluorine, chlorine, bromine and iodine. Chlorine is particularly suitable. Preferably, n does not exceed 1.5 and more especially does not exceed 1. As examples of halogen-containing organoaluminium compounds which may be used in the invention, there may be mentioned aluminium trichloride [AlCl$_3$], ethylaluminium dichloride [Al(C$_2$H$_5$)Cl$_2$], ethylaluminium sesquichloride [Al$_2$(C$_2$H$_5$)$_3$Cl$_3$] and diethylaluminium chloride [Al(C$_2$H$_5$)$_2$Cl]. Ethylaluminium dichloride or isobutylaluminium dichloride is preferred.

After the step for precipitation of the liquid complex using the halogen-containing organoaluminium compound, a solid catalytic complex is collected consisting of a homogeneous precipitate (the constituents being coprecipitated from a liquid complex) of a mixture of a magnesium halide, a transition metal halide and, where appropriate, partially reduced and/or partially halogenated compounds, as well as, where appropriate, the electron donor. These are chemically bonded complexes, produced by chemical reactions and not as a result of mixing or of adsorption phenomena. Indeed, it is impossible to dissociate either of the constituents of these complexes by using purely physical methods of separation.

The step for precipitation of the liquid complex may advantageously be followed by a maturation treatment whose function is to continue the precipitation reaction and to make it possible to obtain a solid catalytic complex having an improved resistance to uncontrolled breakdown in polymerization. The maturation is carried out at a temperature generally equivalent to or above that at which the precipitation takes place. It is carried out for a non-critical period ranging from 5 minutes to 12 hours in general, preferably for at least 0.5 hour.

The step for precipitation of the liquid complex may also be followed, preferably after the optional maturation step, by a washing step so as to remove the excess reactants and the possible by-products formed during the preparation, with which the solid catalytic complex may still be impregnated. Any inert diluent may be used for this washing and, for example, alkanes and cycloalkanes containing up to 20 carbon atoms. Hexane and isobutane are suitable for use. After washing, the solid catalytic complex may be dried, for example by flushing with a stream of an inert gas such as nitrogen, which is preferably dry.

The organometallic compound which serves as activator for the solid catalytic complex and is commonly referred to as the "cocatalyst" may be chosen from organometallic compounds of lithium, magnesium, zinc, aluminium or tin. The best results are obtained with organoaluminium compounds.

As organometallic compound, it is possible to use totally alkylated compounds in which the alkyl chains comprise up to 20 carbon atoms and are straight or branched, such as, for example, n-butyllithium, diethylmagnesium, diethylzinc, tetraethyltin, tetrabutyltin and trialkylaluminiums. It is also possible to use alkyl metal hydrides in which the alkyl radicals also comprise up to 20 carbon atoms, such as diisobutylaluminium hydride and trimethyltin hydride. Alkylmetal halides in which the alkyl radicals also comprise up to 20 carbon atoms are equally suitable, such as ethylaluminium sesquichloride, diethylaluminium chloride and diisobutylaluminium chloride. It is also possible to use organoaluminium compounds obtained by reacting trialkylaluminiums or dialkylaluminium hydrides, in which the radicals comprise up to 20 carbon atoms, with diolefins comprising from 4 to 20 carbon atoms, and more particularly the compounds known as isoprenylaluminiums.

In general, preference is given to trialkylaluminiums and in particular to those in which the alkyl chains are straight and comprise up to 18 carbon atoms, more particularly from 2 to 8 carbon atoms. Triethylaluminium and triisobutylaluminium are preferred.

The total amount of organometallic compound used in the polymerization process of the invention may vary within a wide range. It is generally from 0.02 to 50 mmol per liter of solvent, of diluent or of reactor volume and preferably from 0.2 to 2.5 mmol per 1.

The amount of solid catalytic complex used in the polymerization process of the invention is determined as a function of the transition metal content of the said complex. It is generally chosen such that the concentration is from 0.001 to 2.5 and preferably from 0.01 to 0.25 mmol of transition metal per liter of solvent, of diluent or of reactor volume.

The molar ratio of the total amount of the metal present in the organometallic compound to the total amount of the transition metal present in the transition metal compound is usually at least 1, in particular at least 5, values of at least 10 being advantageous. The ratio is generally not more than 100, preferably not more than 75, values of not more than 50 being recommended.

The polymerization process of the invention may be carried out according to any known process, in solution in a solvent which may be the olefin itself in the liquid state, or in suspension in a hydrocarbon diluent, or alternatively in the gas phase. Good results are obtained in suspension polymerizations. When the process of the invention is carried out according to the third variant, the polymerization is advantageously performed in the gas phase.

The polymerization is performed by placing the olefin in contact with the catalytic system comprising the solid catalytic complex, the organometallic compound and the electron donor.

The olefin which is polymerized may be chosen from olefins containing from 2 to 20 carbon atoms, and preferably from 2 to 6 carbon atoms, such as ethylene, propylene, 1-butene, 4-methyl-1-pentene and 1-hexene. Ethylene, 1-butene and 1-hexene are suitable for use. Ethylene is particularly preferred. Obviously, several different olefins may be used simultaneously in order to obtain copolymers, for example mixtures of two of the olefins mentioned above or mixtures of one or more of these olefins with one or more diolefins preferably comprising from 4 to 20 carbon atoms. These diolefins may be non-conjugated aliphatic diolefins such as 1,4-hexadiene, monocyclic diolefins such as 4-vinylcyclohexene, 1,3-divinylcyclohexane, cyclopentadiene or 1,5-cyclooctadiene, alicyclic diolefins having an endocyclic bridge, such as dicyclopentadiene or norbornadiene, and conjugated aliphatic diolefins such as butadiene and isoprene.

The process according to the invention applies particularly well to the manufacture of ethylene homopolymers and copolymers containing at least 90 mol % of ethylene and preferably 95 mol % of ethylene.

The suspension polymerization is generally carried out in a hydrocarbon diluent such as liquid aliphatic, cycloaliphatic and aromatic hydrocarbons, at a temperature such that at least 80% (preferably at least 90%) of the polymer formed is insoluble therein. The preferred diluents are linear alkanes such as n-butane, n-hexane and n-heptane or branched alkanes such as isobutane, isopentane, isooctane and 2,2-dimethylpropane or cycloalkanes such as cyclopentane and cyclohexane or mixtures thereof. The best results are obtained with hexane and isobutane. The polymerization temperature is generally chosen to be between 20 and 200° C., preferably between 50 and 150° C., in particular between 65 and 115° C. The partial pressure of the olefin is usually chosen to be between atmospheric pressure and 5 MPa, preferably between 0.2 and 2 MPa, more particularly between 0.4 and 1.5 MPa.

The gas-phase polymerization consists in bringing together a gas stream comprising at least one olefin with the catalytic system for example in a fluidized bed. The flow rate of the gas stream must consequently be sufficient to keep the polyolefin in fluidization and depends on the rate of formation of this polyolefin and on the rate at which the catalytic system is consumed. The total partial pressure of the olefin(s) may be below or above atmospheric pressure, the preferred partial pressure ranging from atmospheric pressure to about 7 MPa. In general, a pressure of 0.2 to 5 MPa is suitable for use. The choice of temperature is not critical, and this is generally from 30 to 200° C. It is optionally possible to use a dilution gas, which should be inert with respect to the polyolefin.

The polymerization process of the invention may optionally be carried out in the presence of a molecular weight regulator such as hydrogen.

The polymerization process of the invention may be carried out in a continuous or batchwise manner, in a single reactor or in several reactors arranged in series, the polymerization conditions (temperature, possible comonomer content, possible hydrogen content, type of polymerization medium) in one reactor being different from those used in the other reactors.

The polymerization process of the invention makes it possible to manufacture polyolefins having in particular a low content of oligomers, thereby making them suitable for the subsequent conversion, without formation of fumes, into shaped articles having excellent mechanical properties.

EXAMPLES

The examples which follow are intended to illustrate the invention. The meaning of the symbols used in these examples, the units expressing the magnitudes mentioned and the methods of measuring these magnitudes are explained below.

$MI_2$=melt index of a polyolefin, denoting the flow rate of the molten polyolefin at 190° C. which flows through a die 2 mm in diameter and 8 mm in length, under the action of a piston ballasted with a 2.16 kg weight, this flow rate being expressed in g/10 min, according to ASTM standard D 1238 (1990).

$\mu$=dynamic viscosity of a polyolefin, expressed in dPA.s and measured at a rate gradient of 100 $s^{-1}$ at 190° C.

$\alpha$=activity of the solid catalytic complex, expressed in kg of insoluble polyolefin obtained per hour and per gram of titanium used and per MPa pressure of olefin.

SD=standard density of a polyolefin, expressed in kg/$m^3$ and measured according to ISO standard 1183 (1987).

OC=oligomer content of a polyolefin, expressed in grams of oligomers per kg of polyolefin and measured by extraction into boiling hexane.

$T_{ind}$=induction period of the solid catalytic complex, expressed in minutes and defined as being the time elapsed between introduction of the olefin and the development of a pressure decrease characteristic of the start of the polymerization.

In the examples, solid catalytic complexes were prepared and were then used for the polymerization of ethylene. Examples 1, 3 and 5 illustrate the first variant of the invention; Examples 2, 4 and 6 are given by way of comparison. Examples 7 and 9 illustrate the second variant of the invention; Examples 8 and 10 are given by way of comparison. Examples 11 and 13 illustrate the third variant of the invention; Example 12 is given by way of comparison.

Example 1 (in accordance with the invention)

In this example, ethylene was polymerized with the incorporation of a cocatalyst and a solid catalytic complex prepared using an electron donor after the first step for formation of a liquid complex and before the subsequent step for precipitation of the said liquid complex, according to the first variant of the invention described above.

A. Preparation of the solid catalytic complex

A.1. Formation of a liquid complex

Magnesium diethoxide, which was prepared in situ by reacting magnesium metal with ethanol, was reacted for 5 hours at 110° C. with titanium tetrabutoxide in amounts such that the molar ratio of titanium to magnesium was equal to 2.

A.2. Treatment using an electron donor

Ethyl benzoate was added, with stirring, to the liquid complex obtained in A.1. and diluted in hexane, the addition being in an amount such that the molar ratio of ethyl benzoate to titanium was equal to 1. The mixture thus obtained was maintained at 35° C. and stirred for 0.5 hour.

A.3. Precipitation

The treated complex obtained in A.2. was precipitated by placing it in contact with a solution of isobutylaluminium dichloride in hexane (in an amount such that the molar ratio of aluminium to titanium was equal to 6) with stirring for 2 hours at 45° C. The mixture thus obtained underwent a maturation for 45 minutes at 60° C. The solid catalytic complex was then collected and washed in hexane. The solid catalytic complex obtained comprised (% by weight):

Ti: 11.8

Cl: 46.3

Al: 1.6

Mg: 6.0.

The remainder was made up of elements originating from the products used for the manufacture of the solid catalytic complex, such as carbon, hydrogen and oxygen.

B. Polymerization of ethylene 1 l of hexane and 2 mmol of triethylaluminium (cocatalyst) were introduced into a 3 liter autoclave. The temperature was then raised to 85° C. and kept constant throughout the polymerization. A single dose of hydrogen at a pressure of 0.4 MPa and ethylene were then introduced thereto. 2.6 mg of the solid catalytic complex obtained in A were then injected therein. The partial pressure of ethylene was kept constant at a value of 0.6 MPa for 2 hours. The autoclave was then degassed and cooled. The catalytic complex had an $\alpha$ activity of 198. 74 g of polyethylene having the following characteristics were collected from the autoclave:

$MI_2$=5.7

SD=965.8

OC=6.3

$\mu$=6700.

Example 2 (given by way of comparison)

In this example, ethylene was polymerized under the operating conditions of Example 1.B. (and in particular in the presence of the amount of hydrogen used in Example 1.B.) with the incorporation of a solid catalytic complex prepared without an electron donor.

A. Preparation of the solid catalytic complex

The operations of Example 1.A. were repeated, except that Step A.2. was omitted. The solid catalytic complex obtained comprised (% by weight):

Ti: 19.5

Cl: 63.2

Al: 2.8

Mg: 5.4.

The remainder was made up of elements originating from the products used for the manufacture of the solid catalytic complex, such as carbon, hydrogen and oxygen.

B. Polymerization of ethylene

The operations of Example 1.B. were repeated, injecting 4.4 mg of the solid catalytic complex. The catalytic complex had an α activity of 72. 75 g of polyethylene having the following characteristics were collected from the autoclave:

$MI_2$=1.4

SD=963.7

OC=11.0

$\mu$=13900.

Comparison of the results of Example 2 ($MI_2$=1.4, which corresponds to high polyethylene molecular weights) with those of Example 1 ($MI_2$=5.7, which corresponds to low polyethylene molecular weights) demonstrates the progress provided by the invention as regards the response to hydrogen of the solid catalytic complexes, and shows in particular that the solid catalytic complex of Example 2 is less sensitive to hydrogen than the solid catalytic complex of Example 1.

Example 3 (in accordance with the invention)

In this example, the solid catalytic complex of Example 1, manufactured according to the first variant of the invention described above, was used for the manufacture of a copolymer of ethylene and butene.

A. Preparation of the solid catalytic complex The operations of Example 1.A. were repeated.

B. Copolymerization of ethylene

Ethylene was continuously copolymerized with butene in a loop reactor into which hexane, ethylene (in an amount such that the ethylene concentration in the hexane was equal to 13 g/liter), hydrogen (in an amount such that the hydrogen/ethylene molar ratio was equal to 0.076), butene (in an amount such that the butene/ethylene molar ratio was equal to 0.057), triethylaluminium (in an amount such that the concentration, expressed as aluminium, in the hexane was equal to 25 ppm) and the solid catalytic complex obtained in Example 1.A. were introduced continuously. The temperature in the reactor was 80° C. The continuous process was characterized by a residence time of 3 h and a production of 30 kg/h. The polyethylene collected had the following characteristics:

$MI_2$=1.9

SD=952.3

OC=2.5

$\mu$=13800.

Example 4 (given by way of comparison)

In this example, a copolymer of ethylene and butene having the $MI_2$ and SD values of the copolymer of Example 3 (by adapting the concentration of the hydrogen and of the butene in the process of Example 3.B.) was prepared in the presence of a solid catalytic complex without an electron donor.

A. Preparation of the solid catalytic complex

The operations of Example 1.A. were repeated, except that Step A.2. was omitted. The solid catalytic complex obtained comprised (% by weight):

Ti: 19.5

Cl: 63.2

Cl: 2.8

Mg: 5.4.

The remainder was made up of elements originating from the products used for the manufacture of the solid catalytic complex, such as carbon, hydrogen and oxygen.

B. Copolymerization of ethylene

The operations of Example 3.B. were repeated using the catalyst obtained in A under the following operating conditions:

hydrogen/ethylene molar ratio=0.094 butene/ethylene molar ratio=0.051.

The polyethylene collected had the following characteristics:

$MI_2$=1.8

SD=953.7

OC=4.5

$\mu$=13700.

Comparison of the results of Example 4 with those of Example 3 demonstrates the progress provided by the invention as regards the oligomer content of the polyolefins obtained, and shows in particular that the solid catalytic complex of Example 4 leads to a higher oligomer content when it is used for the manufacture of a polyethylene of given $MI_2$ and SD values.

Example 5 (in accordance with the invention)

In this example, a solid catalytic complex was prepared by using an electron donor after the first step in the formation of a liquid complex and before the subsequent precipitation step, according to the first variant of the invention described above. The particle size of the solid catalytic complex was then analysed.

A. Preparation of the solid catalytic complex

A.1. Formation of a liquid complex

Magnesium diethoxide, which was prepared in situ by reacting magnesium metal with ethanol, was reacted for 5 hours at 110° C. with titanium tetrabutoxide in amounts such that the molar ratio of titanium to magnesium was equal to 2.

A.2. Treatment using an electron donor

Ethyl benzoate was added, with stirring to the liquid complex obtained in A.1. and diluted in hexane, the addition being in an amount such that the molar ratio of ethyl benzoate to titanium was equal to 1. The mixture thus obtained was maintained at 35° C. with stirring for 0.5 hour.

A.3. Precipitation

The treated complex obtained in A.2. was precipitated by placing it in contact with a solution of ethylaluminium dichloride (in an amount such that the molar ratio of aluminium to titanium was equal to 3.75) with stirring for 1.5 hours at 45° C. The mixture thus obtained underwent a maturation for 45 minutes at 60° C. The solid catalytic complex was then collected and washed in hexane. The solid catalytic complex obtained comprised (% by weight):

Ti: 14.3

Cl: 32.4

Al: 0.4

Mg: 3.5.

The remainder was made up of elements originating from the products used for the manufacture of the solid catalytic complex, such as carbon, hydrogen and oxygen.

B. Particle size

The particle size of the solid catalytic complex obtained was characterized by a mean diameter (<d>) of 19 $\mu$m and a particle size distribution width $\sigma$/<d>=0.43 ($\sigma$ representing the standard deviation).

Example 6 (given by way of comparison)

In this example, a solid catalytic complex was prepared without electron donor, and the particle size of this complex was then analysed.

A. Preparation of the solid catalytic complex

The operations of Example 5.A. were repeated, except that Step A.2. was omitted. The solid catalytic complex obtained comprised (% by weight):

Ti:17.7.
Cl:38.6
Al:2.1
Mg:4.4 and had a particle size defined by a mean diameter ($<d>$) of 14 μm and a particle size distribution width σ/$<d>$=1.57.

Comparison of the result of Example 6 with that of Example 5 demonstrates the progress provided by the invention as regards the particle size distribution width of the solid catalytic complexes.

Example 7 (in accordance with the invention)

In this example, ethylene was polymerized with the incorporation of a catalytic system comprising a solid catalytic complex prepared by using an electron donor after the step for precipitation of the liquid complex and before introducing it into the polymerization medium, according to the second variant of the invention described above.

A. Preparation of the solid catalytic complex

A.1. Formation of a liquid complex

Magnesium diethoxide, which was prepared in situ by reacting magnesium metal with ethanol, was reacted for 5 hours at 110° C. with titanium tetrabutoxide in amounts such that the molar ratio of titanium to magnesium was equal to 2.

A.2. Precipitation

The liquid complex obtained in A.1. was precipitated by placing it in contact with a solution of isobutylaluminium dichloride (in an amount such that the molar ratio of aluminium to titanium was equal to 6) with stirring for 2 hours at 45° C. The mixture thus obtained underwent maturation for 45 minutes at 60° C. The solid catalytic complex was then collected and washed in hexane.

A.3. Treatment using an electron donor

Ethyl benzoate was added, with stirring, to a suspension of the solid catalytic complex obtained in A.2. in hexane, the addition being in an amount such that the molar ratio of ethyl benzoate to titanium was equal to 10. The mixture thus obtained was maintained at 30° C. with stirring for 1 hour. The solid thus treated was washed in hexane. The solid catalytic complex obtained comprised (% by weight):

Ti: 16.6
Cl: 59.1
Al: 2.5
Mg: 4.8.

The remainder was made up of elements originating from the products used for the manufacture of the solid catalytic complex, such as carbon, hydrogen and oxygen.

B. Polymerization of ethylene 1 l of hexane and 2 mmol of triethylaluminium were introduced into a 3 liter autoclave fitted with a stirrer. The temperature was then raised to 85° C. and kept constant throughout the polymerization. A single dose of hydrogen at a pressure of 0.4 MPa and ethylene were then introduced thereto. 10.2 mg of the solid catalytic complex obtained in A were then injected therein. The partial pressure of ethylene was kept constant at a value of 0.6 MPa for 2 hours. The autoclave was then degassed and cooled. The catalytic complex had an α activity of 69. 145 g of polyethylene, which had the following characteristics, were collected from the autoclave:

$MI_2$=2.7
SD=964.1
OC=11.9.

Example 8 (given by way of comparison)

In this example, a polyethylene having the $MI_2$ and SD values of the polyethylene of Example 7 was manufactured with the incorporation of a solid catalytic complex prepared without electron donor.

A. Preparation of the solid catalytic complex

The operations of Example 7.A. were repeated, except that Step A.3. was omitted. The solid catalytic complex obtained comprised (% by weight):

Ti: 17.0
Cl: 61.2
Al: 2.7
Mg: 4.6.

The remainder was made up of elements originating from the products used for the manufacture of the solid catalytic complex, such as carbon, hydrogen and oxygen.

B. Polymerization of ethylene

The operations of Example 7.B. were repeated, injecting 7.9 mg of the solid catalytic complex. The catalytic complex had an α activity of 79. 128 g of polyethylene, which had the following characteristics, were collected from the autoclave:

$MI_2$=2.9
SD=964.2
OC=18.2

Comparison of the results of Example 8 with those of Example 7 demonstrates the progress provided by the invention as regards the oligomer content of the polyethylenes obtained, and shows in particular that the solid catalytic complex of Example 8 leads to a higher oligomer content when it is used for the manufacture of a polyethylene of given $MI_2$ and SD values.

Example 9 (in accordance with the invention)

In this example, ethylene was polymerized with the incorporation of a solid catalytic complex containing two different transition metals, which was prepared according to the second variant of the invention described above.

A. Preparation of the solid catalytic complex

A.1. Formation of a liquid complex

Magnesium diethoxide was reacted, for 7 hours at 140° C. with titanium tetrabutoxide and zirconium tetrabutoxide in amounts such that the molar ratio of titanium to magnesium was equal to 0.6 and such that the molar ratio of zirconium to titanium was equal to 2.

A.2. Precipitation

The liquid complex obtained in A.1. was precipitated by placing it in contact with a solution of isobutylaluminium dichloride (in an amount such that the molar ratio of aluminium to the total amount of titanium and zirconium used was equal to 7.8) with stirring for 120 minutes at 45° C. The mixture thus obtained underwent a maturation for 90 minutes at 60° C. The solid catalytic complex was then collected and washed in hexane.

A.3. Treatment using an electron donor

Ethyl benzoate was added, with stirring, to a suspension of the solid catalytic complex obtained in A.2. in hexane, the addition being in an amount such that the molar ratio of ethyl benzoate to the total amount of titanium and zirconium used was equal to 4.2. The mixture thus obtained was maintained at 35° C. with stirring for 1 hour. The solid thus treated was washed in hexane. The solid catalytic complex obtained comprised (% by weight):

Ti: 3
Zr: 8.1
Cl: 25.5
Al: 0.5
Mg: 2.5.

The remainder was made up of elements originating from the products used for the manufacture of the solid catalytic complex, such as carbon, hydrogen and oxygen.

B. Polymerization of ethylene 1 l of hexane and 2 mmol of triisobutylaluminium were introduced into a 3 liter autoclave fitted with a stirrer. The temperature was then raised to 85° C. and was kept constant throughout the polymerization. A single dose of hydrogen at a pressure of 0.9 MPa and ethylene were then introduced thereto. 45 mg of the solid catalytic complex obtained in A were then injected therein. The partial pressure of ethylene was kept constant at a value of 0.6 MPa for 2 hours. The autoclave was then degassed and cooled. The catalytic complex had an α activity of 144. 234 g of polyethylene, which had the following characteristics, were collected in the autoclave:

$MI_2$=22
SD=967.4
OC=32.

Example 10 (given by way of comparison)

In this example, ethylene was polymerized under the conditions of Example 9.B. with the incorporation of a solid catalytic complex comprising two different transition metals, which was prepared without electron donor.

A. Preparation of the solid catalytic complex

The operations of Example 9.A. were repeated, except that Step A.3. was omitted. The solid catalytic complex obtained comprised (% by weight):

Ti: 5.3
Zr: 8.1
Cl: 51.3
Al: 1.7
Mg: 4.1.

The remainder was made up of elements originating from the products used for the manufacture of the solid catalytic complex, such as carbon, hydrogen and oxygen.

B. Polymerization of ethylene

The operations of Example 9.B. were repeated, injecting 51 mg of the solid catalytic complex. The catalytic complex had an a activity of 113. 365 g of polyethylene, which had the following characteristics, were collected from the autoclave:

$MI_2$=0.1
SD=960.2
OC=33.

Comparison of the results of Example 10 ($MI_2$=0.1, which corresponds to high polyethylene molecular weights) with those of Example 9 ($MI_2$=22, which corresponds to low polyethylene molecular weights) demonstrates the progress provided by the invention as regards the response to hydrogen of the solid catalytic complexes, and shows in particular that the solid catalytic complex of Example 10 is considerably less sensitive to hydrogen than the solid catalytic complex of Example 9.

Example 11 (in accordance with the invention)

In this example, ethylene was polymerized in the presence of an electron-donor-free solid catalytic complex and a mixture of an electron donor with an organometallic compound, according to the particularly advantageous embodiment of the third variant of the invention described above.

A. Preparation of the solid catalytic complex

A.1. Formation of a liquid complex

Magnesium diethoxide, which was prepared in situ by reacting magnesium metal with ethanol, was reacted for 5 hours at 110° C. with titanium tetrabutoxide in amounts such that the molar ratio of titanium to magnesium was equal to 2.

A.2. Precipitation

The liquid complex obtained in A.1. was precipitated by placing it in contact with a solution of isobutylaluminium dichloride (in an amount such that the molar ratio of aluminium to titanium was equal to 6) with stirring for 2 hours at 45° C. The mixture thus obtained underwent a maturation for 45 minutes at 60° C. The solid catalytic complex was then collected and washed several times in hexane. The solid catalytic complex obtained comprised (% by weight):

Ti: 19.5
Cl: 63.2
Al: 2.8
Mg: 5.4.

The remainder was made up of elements originating from the products used for the manufacture of the solid catalytic complex, such as carbon, hydrogen and oxygen.

B. Mixture of the electron donor and the organometallic compound

A solution of triethylaluminium in hexane and ethyl benzoate in a benzoate/triethylaluminium molar ratio of 0.25 were mixed together at room temperature for a few minutes.

C. Polymerization of ethylene 1 l of hexane and an amount of the mixture obtained in B containing 2 mmol of triethylaluminium were introduced into a 3 liter autoclave fitted with a stirrer. The temperature was then raised to 85° C. and kept constant throughout the polymerization. A single dose of hydrogen at a pressure of 0.4 MPa and ethylene were then introduced thereto. 7.1 mg of the solid catalytic complex obtained in A. were then injected therein. The partial pressure of ethylene was kept constant at a value of 0.6 MPa for 2 hours. The autoclave was then degassed and cooled. The catalytic complex had an a activity of 124. 208 g of polyethylene, which had the following characteristics, were collected from the autoclave:

$MI_2$=3.4
SD=962.8
OC=16.9
$\mu$=8500.

Example 12 (given by way of comparison)

In this example, ethylene was polymerized under the conditions of Example 11.B. in the presence of a solid catalytic complex and a cocatalyst and in the absence of an electron donor.

A. Preparation of the solid catalytic complex The operations of Example 11.A. were repeated.

B Polymerization of ethylene

The operations of Example 11.C. were repeated, introducing 2 mmol of triethylaluminium into the autoclave instead of the benzoate-triethylaluminium mixture, and injecting 6.0 mg of the solid catalytic complex.

The catalytic complex had an α activity of 64 and an induction period $T_{ind}$ of 0 minutes. 90 g of polyethylene, which had the following characteristics, were collected from the autoclave:

$MI_2$=1.9
SD=964.1
OC=18.9
$\mu$=11500.

Comparison of the results of Example 12 with those of Example 11 demonstrates the progress provided by the invention as regards the catalytic activity of the solid catalytic complexes.

Example 13 (in accordance with the invention)

In this example, ethylene was polymerized in the presence of an electron-donor-free solid catalytic complex and a mixture of an electron donor with an organometallic compound, according to the particularly advantageous embodiment of the third variant of the invention described above.

A. Preparation of the solid catalytic complex The operations of Example 11.A. were repeated.

B. Mixture of the electron donor and the organometallic compound

A solution of triethylaluminium in hexane and ethyl benzoate, in a benzoate/triethylaluminium molar ratio of 0.294, were mixed together at room temperature for a few minutes.

C. Polymerization of ethylene 1 l of hexane and an amount of the mixture obtained in B containing 2 mmol of triethylaluminium were introduced into a 3 liter autoclave fitted with a stirrer. The temperature was then raised to 85° C. and kept constant throughout the polymerization. A single dose of hydrogen at a pressure of 0.4 MPa and ethylene were then introduced thereto. 4.9 mg of the solid catalytic complex obtained in A were then injected therein. The partial pressure of ethylene was kept constant at a value of 0.6 MPa for 4 hours. The autoclave was then degassed and cooled. The catalytic complex had an $\alpha$ activity of 33 and an induction period $T_{ind}$ of 120 minutes. 76 g of polyethylene, which had the following characteristics, were collected from the autoclave:

$MI_2$=0.95
SD=961.6
OC=17.2
$\mu$=15900.

Comparison of the results of Example 13 with those of Example 12 demonstrates the change provided by the invention as regards the induction period of the solid catalytic complexes.

Example 14 (in accordance with the invention)

In this example, ethylene was polymerized with the incorporation of a cocatalyst and a solid catalytic complex prepared using an electron donor after the first step for formation of a liquid complex and before the subsequent step of precipitation of the said liquid complex, according to the first variant of the invention described above.

A. Preparation of the solid catalytic complex
A.1. Formation of a liquid complex Magnesium diethoxide, which was prepared in situ by reacting magnesium metal with ethanol, was reacted for 5 hours at 110° C. with titanium tetrabutoxide in amounts such that the molar ratio of titanium to magnesium was equal to 1.

A.2. Treatment using an electron donor

Ethyl benzoate was added, with stirring, to the liquid complex obtained in A.1. and diluted in hexane, the addition being in an amount such that the molar ratio of ethyl benzoate to magnesium in the final solid catalytic complex was equal to 0.1. The mixture thus obtained was maintained at 35° C. with stirring for 0.5 hour.

A.3. Precipitation

The treated complex obtained in A.2. was precipitated by placing it in contact with a solution of isobutylaluminium dichloride in hexane (in an amount such that the molar ratio of aluminium to titanium was equal to 7) with stirring for 1.5 hours at 45° C. The mixture thus obtained underwent a maturation for 45 minutes at 60° C. The solid catalytic complex was then collected and washed in hexane. The solid catalytic complex obtained comprised (% by weight):

Ti: 12.4
Cl: 53.7
Al: 3.8
Mg: 7.7.

The remainder was made up of elements originating from the products used for the manufacture of the solid catalytic complex, such as carbon, hydrogen and oxygen. The particle size of the solid catalytic complex was characterized by a mean diameter (<d>) of 9 $\mu$m.

B. Polymerization of ethylene 1 l of hexane and 2 mmol of triethylaluminium (cocatalyst) were introduced into a 3 liter autoclave fitted with a stirrer. The temperature was then raised to 85° C. and kept constant throughout the polymerization. A single dose of hydrogen at a pressure of 0.2 MPa and ethylene were then introduced thereto. 7.8 mg of the solid catalytic complex obtained in A were then injected therein. The partial pressure of ethylene was kept constant at a value of 0.6 MPa for 2 hours. The autoclave was then degassed and cooled. 263 g of polyethylene, which had the following characteristics, were collected from the autoclave:

$MI_2$=0.47
SD=959.0
apparent density=318
$\mu$=23000.

Example 15 (given by way of comparison)

In this example, ethylene was, polymerized under the operating conditions of Example 14.B. with the incorporation of a solid catalytic complex prepared using the electron donor during the first step for formation of a liquid complex.

A. Preparation of the solid catalytic complex
A.1. Formation of a liquid complex Magnesium diethoxide was reacted, for 4 hours at 140° C., with titanium tetrabutoxide in amounts such that the molar ratio of titanium to magnesium was equal to 1, and with ethyl benzoate in an amount such that the molar ratio of ethyl benzoate to magnesium in the final solid catalytic complex was equal to 0.1.

A.2. Precipitation

The complex obtained in A.1. was precipitated by placing it in contact with a solution of isobutylaluminium dichloride in hexane (in an amount such that the molar ratio of aluminium to titanium was equal to 7) with stirring for 1.5 hours at 45° C. The mixture thus obtained underwent a maturation for 45 minutes at 60° C. The solid catalytic complex was then collected and washed in hexane. The solid catalytic complex obtained comprised (% by weight):

Ti: 12.0
Cl: 55.8
Al: 3.4
Mg: 8.3.

The remainder was made up of elements originating from the products used for the manufacture of the solid catalytic complex, such as carbon, hydrogen and oxygen. The particle size of the solid catalytic complex was characterized by a mean diameter (<d>) of 38 µm.

B. Polymerization of ethylene

The operations of Example 14.B. were repeated, except that the amount of solid catalytic complex used was 4.2 mg. 168 g of polyethylene, which had the following characteristics, were collected from the autoclave:

$MI_2$=0.57

SD=959.3 apparent density=222

µ=21400.

Comparison of the results of Example 15 with those of Example 14 demonstrates the progress provided by the invention as regards the apparent density of the polymers obtained.

I claim:

1. A process for the manufacture of ethylene homopolymers and copolymers containing at least 90 mol % of ethylene, according to which ethylene in a polymerization medium is placed in contact with a catalytic system comprising:
   a) a solid catalytic complex based on magnesium, on transition metal and on halogen, the said catalytic complex being prepared by reacting, in a first step, in the absence of an electron donor, at least one magnesium compound chosen from oxygen-containing organic magnesium compounds and halogen-containing magnesium compounds with at least one compound of a transition metal from group IVB or VB of the Periodic Table chosen from oxygen-containing organic compounds and halogen-containing compounds of a transition metal, until a liquid complex is obtained, and, in a subsequent step, by precipitating the said liquid complex using a halogen-containing organoaluminium compound of general formula $AlR_nX_{3-n}$ in which R is a hydrocarbon radical, X is a halogen and n is less than 3, in order to collect a solid catalytic complex,
   b) an organometallic compound of a metal from groups IA, IIA, IIB, IIIA and IVA of the Periodic Table, and
   c) at least one electron donor selected from the group consisting of organic compounds containing at least one atom or at least one group of atoms having at least one pair of free electrons, with the exception of alcohols, phenols, silanes, and polysiloxanes, said at least one electron donor used after the first step in the preparation of a liquid complex leading to the solid catalytic complex.

2. The process according to claim 1, wherein the electron donor is used during the preparation of the solid catalytic complex immediately after the first step for the preparation of a liquid complex leading to the solid catalytic complex and before the subsequent precipitation step by adding said electron donor to said liquid complex.

3. The process according to claim 1, wherein the electron donor is used during the preparation of the solid catalytic complex after the step for precipitation of the liquid complex to form a solid catalytic complex by adding said electron donor to said solid catalytic complex and before placing the solid catalytic complex in contact with the ethylene to effect polymerization.

4. The process according to claim 2, wherein the electron donor is used in an amount from 0.01 to 50 mol per mole of total amount of transition metal used.

5. The process according to claim 1, wherein the electron donor is used during the polymerization of ethylene by adding it into said polymerization medium.

6. The process according to claim 5, wherein the electron donor is introduced into the polymerization medium mixed with the organometallic compound.

7. The process according to claim 5, wherein the electron donor is used in an amount such that the molar ratio of the amount of organometallic compound used to the amount of electron donor used is from 0.01 to 100.

8. The process according to claim 1, wherein the solid catalytic complex is not prepolymerized.

9. The process according to claim 1, wherein the electron donor is chosen from organic acid esters.

10. The process according to claim 9, wherein the electron donor is ethyl benzoate.

11. The process according to claim 1, wherein the magnesium compound is chosen from magnesium dialkoxides.

12. The process according to claim 1, wherein the transition metal compound is chosen from titanium tetraalkoxides.

13. The process according to claim 1, wherein the halogen-containing organoaluminium compound is chosen from ethylaluminium dichloride and isobutylaluminium dichloride.

14. The process according to claim 1, wherein the organometallic compound is chosen from triethylaluminium and triisobutylaluminium.

15. The process according to claim 1, wherein the ethylene is homopolymerized or copolymerized with olefins containing from 3 to 20 carbon atoms to produce ethylene (co)polymers containing at least 90 mol % ethylene.

16. The process according to claim 3, wherein the electron donor is used in an amount from 0.01 to 50 mol per mole of total amount of transition metal used.

17. The process according to claim 1, wherein the electron donor is selected from the group consisting of ethers, ketones, aldehydes, organic acids, organic acid esters, organic acid halides, organic acid amides, amines and nitriles.

18. A process for the polymerization of ethylene, according to which ethylene in a polymerization medium is placed in contact with a catalytic system comprising:
   a) a solid catalytic complex based on magnesium, on transition metal and on halogen, the said catalytic complex being prepared by reacting, in a first step, in the absence of an electron donor, at least one magnesium compound chosen from oxygen-containing organic magnesium compounds and halogen-containing magnesium compounds with at least one compounds of a transition metal from group IVB or VB of the Periodic Table chosen from oxygen-containing organic compounds and halogen-containing compounds of a transition metal, until a liquid complex is obtained, and, in a subsequent step, by precipitating the said liquid complex using a halogen-containing organoaluminium compound of general formula $AlR_nX_{3-n}$ in which R is a hydrocarbon radical, X is a halogen and n is less than 3, in order to collect a solid catalytic complex,
   b) an organometallic compound of a metal from groups IA, IIA, IIB, IIIA and IVA of the Periodic Table,
   c) at least one electron donor selected from the group consisting of organic compounds containing at least one atom or at least one group of atoms having at least one pair of free electrons, with the exception of alcohols, phenols, silanes, and polysiloxanes, wherein the electron donor is used during the preparation of the solid catalytic complex immediately after the first step for the preparation of a liquid complex leading to the solid catalytic complex and before the subsequent precipitation step by adding said electron donor to said liquid complex, to form an ethylene which is homopolymerized or copolymerized with olefins containing from 3 to 20 carbon atoms to produce ethylene (co) polymers containing at least 90 mol % ethylene.

19. A process for the polymerization of ethylene according to which ethylene in a polymerization medium is placed in contact with a catalytic system comprising:

a) a solid catalytic complex based on magnesium, on transition metal and on chlorine, the said catalytic complex being prepared by reacting, in a first step, in the absence of an electron donor, at least one magnesium compound chosen from oxygen-containing organic magnesium compounds and chlorine-containing magnesium compounds with at least one compound of a transition metal from group IVB or VB of the Periodic Table chosen from oxygen-containing organic compounds and chlorine-containing compounds of a transition metal, until a liquid complex is obtained, and, in a subsequent step, by precipitating the said liquid complex using a chlorine-containing organoaluminium compound of general formula $AlR_nCl_{3-n}$ in which R is a hydrocarbon radical, and n is less than 3, in order to collect a solid catalytic complex, b) an organometallic compound of a metal from groups IA, IIA, IIB, IIIA and IVA of the Periodic Table, c) at least one electron donor selected from the group consisting of organic compounds containing at least one atom or at least one group of atoms having at least one pair of free electrons, with the exception of alcohols, phenols, silanes, and polysiloxanes, said at least one electron donor used after the first step in the preparation of a liquid complex leading to the solid catalytic complex.

20. A process for the polymerization of ethylene, according to which ethylene in a polymerization medium is placed in contact with a catalytic system comprising:

a) a solid catalytic complex based on magnesium, on transition metal and on halogen, the said catalytic complex being prepared by reacting, in a first step, in the absence of an electron donor, at least one magnesium compound chosen from oxygen-containing organic magnesium compounds and halogen-containing magnesium compounds with at least one compound of a transition metal from group IVB or VB of the Periodic Table chosen from oxygen-containing organic compounds and halogen-containing compounds of a transition metal, until a liquid complex is obtained, and, in a subsequent step, by precipitating the said liquid complex using a halogen-containing organoaluminium compound of general formula $AlR_nX_{3-n}$ in which R is a hydrocarbon radical, X is a halogen and n is less than 3, in order to collect a solid catalytic complex, b) an organometallic compound of a metal from groups IA, IIA, IIB, IIIA, and IVA of the Periodic Table, c) at least one electron donor selected from the group consisting of organic compounds containing at least one atom or at least one group of atoms having at least one pair of free electrons, with the exception of alcohols, phenols, silanes, and polysiloxanes, wherein the electron donor is used during the preparation of the solid catalytic complex after the step for precipitation of the liquid complex to form a solid catalytic complex by adding said electron donor to said solid catalytic complex and before placing the solid catalytic complex in contact with the ethylene to effect polymerization.

21. A process for the polymerization of ethylene, according to which ethylene in a polymerization medium is placed in contact with a catalytic system comprising:

a) a solid catalytic complex based on magnesium, on transition metal and on halogen, the said catalytic complex being prepared by reacting, in a first step, in the absence of an electron donor, at least one magnesium compound chosen from oxygen-containing organic magnesium compounds and halogen-containing magnesium compounds with at least one compound of a transition metal from group IVB or VB of the Periodic Table chosen from oxygen-containing organic compounds and halogen-containing compounds of a transition metal, until a liquid complex is obtained, and, in a subsequent step, by precipitating the said liquid complex using a halogen-containing organoaluminium compound of general formula $AlR_nX_{3-n}$ in which R is a hydrocarbon radical, X is a halogen and n is less than 3, in order to collect a solid catalytic complex, b) an organometallic compound of a metal from groups IA, IIA, IIB, IIIA, and IVA of the Periodic Table, c) at least one electron donor selected from the group consisting of organic compounds containing at least one atom or at least one group of atoms having at least one pair of free electrons, with the exception of alcohols, phenols, silanes, and polysiloxanes, wherein the electron donor is used during the polymerization of ethylene by adding it into said polymerization medium.

* * * * *

UNITED STATES PATENT AND TRADEMARK OFFICE
CERTIFICATE OF CORRECTION

PATENT NO.   : 6,545,106 B1
DATED        : September 4, 2003
INVENTOR(S)  : Jiang Bian It is certified that error appears in the above-identified patent and that said Letters Patent is hereby corrected as shown below:

Title page,
Item [54], Title, delete "OLEFINES" and insert -- OLEFINS --.
Item [73], Assignee, delete "Solvay (Societe Anonyme)" and insert -- Solvay Polyolefins Europe – Belgium (Société Anonyme) --.

Signed and Sealed this

Fourteenth Day of December, 2004

JON W. DUDAS
*Director of the United States Patent and Trademark Office*